United States Patent [19]
Gynn

[11] 3,803,678
[45] Apr. 16, 1974

[54] THE METHOD OF MAKING NICKEL OXIDE CAPACITOR

[75] Inventor: George E. Gynn, Fort Wayne, Ind.

[73] Assignee: Syncro Corporation, Oxford, Mich.

[22] Filed: Oct. 18, 1971

[21] Appl. No.: 190,368

Related U.S. Application Data

[63] Continuation of Ser. No. 67,702, Aug. 28, 1970, abandoned, which is a continuation-in-part of Ser. No. 3,874, May 4, 1970, abandoned, which is a continuation of Ser. No. 738,328, June 19, 1968, abandoned.

[52] U.S. Cl................. 29/25.42, 117/217, 148/6.3, 317/258
[51] Int. Cl............................................. H01g 13/00
[58] Field of Search........... 29/25.42; 117/215, 217, 117/69; 148/6.3; 317/258, 261; 219/75

[56] References Cited
UNITED STATES PATENTS

| | | | |
|---|---|---|---|
| 3,174,025 | 3/1965 | Johnson................................ | 219/75 |
| 3,254,282 | 5/1966 | West................................... | 317/258 |
| 3,353,124 | 11/1967 | Dilger............................. | 317/258 X |
| 3,496,435 | 2/1970 | Manley........................... | 317/261 X |
| 3,523,224 | 8/1970 | Gamari............................... | 317/258 |
| 3,691,433 | 9/1972 | Garstang......................... | 317/258 X |

*Primary Examiner*—E. A. Goldberg
*Attorney, Agent, or Firm*—Harness, Dickey & Pierce

[57] ABSTRACT

Process of preparing a solid capacitor from a sheet member formed of nickel having a thickness between 8 and 21 mils, by pre-firing the nickel sheet in a specifically controlled oxygen containing atmosphere to form a nickel oxide layer on a surface of the nickel sheet, applying a coating composition over the nickel oxide layer, said coating composition comprising a silver coating material and a frit material and said coating composition being free of detrimental components which might reduce volume resistivity of the nickel oxide layer, drying the coating composition, firing the coating composition at a temperature which is sufficiently high to remove excess oxygen in the nickel oxide layer, said frit material being operative for wetting and sealing the surface of the nickel oxide layer but with said sealing not occurring too rapidly so as to prevent removal of the excess oxygen, and hermetically sealing the capacitor product formed; and, the solid capacitor product formed as disclosed herein.

6 Claims, 1 Drawing Figure

THE METHOD OF MAKING NICKEL OXIDE CAPACITOR

CROSS REFERENCE TO RELATED APPLICATIONS

This is a continuation of application Ser. No. 67,702 which, now abandoned, application is a continuation-in-part of copending application Ser. No. 31,874, filed May, 4, 1970 now abandoned, entitled "Metal Oxide Capacitor and Method"; and, said latter application Ser. No. 31,874, now abandoned is in turn a continuation application of parent application Ser. No. 738,328, now abandoned, filed June 19, 1968.

BACKGROUND OF THE INVENTION

This invention broadly relates to an improved process of preparing a nickel oxide capacitor and the resulting solid capacitor product.

Prior art techniques of preparing nickel oxide capacitors are illustrated in Dilger U.S. Pat. No. 3,353,124 and Garstang et al. U.S. Pat. No. 3,259,818. Other references which make up the state of the prior art are U.S. Pat. Nos. 1,709,427; 1,924,606; 1,966,297; 2,299,228; 2,448,513; 2,504,178; 2,506,130; 2,703,857; 2,899,345; 3,028,447; 3,050,409; 3,093,883; 3,166,693; 3,254,282; 3,259,857; 3,363,156; 3,455,741; Canadian Pat. No. 665,489; and, British Pat. No. 438,444.

One object of this invention is to provide a novel and improved process for preparing nickel oxide capacitors.

Another object of the present invention is to provide a process of manufacturing nickel oxide capacitors wherein the capacitors made have a highly acceptable insulation resistance rating.

Another object of the present invention is to provide an improved solid capacitor prepared by the inventive disclosure herein.

Another object of the present invention is to provide an improved nickel oxide capacitor product having a highly acceptable insulation resistance rating with said capacitor product being formed in accordance with the process disclosed herein.

Other objects, features and advantages of the present invention will become apparent from the subsequent description and the appended claims taken in conjunction with the accompanying drawings.

BRIEF DESCRIPTION OF THE DRAWING

The FIGURE illustrates a block diagram showing in a purposely over-simplified fashion the broad sequence of steps utilized in the process of this invention.

SUMMARY OF THE INVENTION

Figure 1:
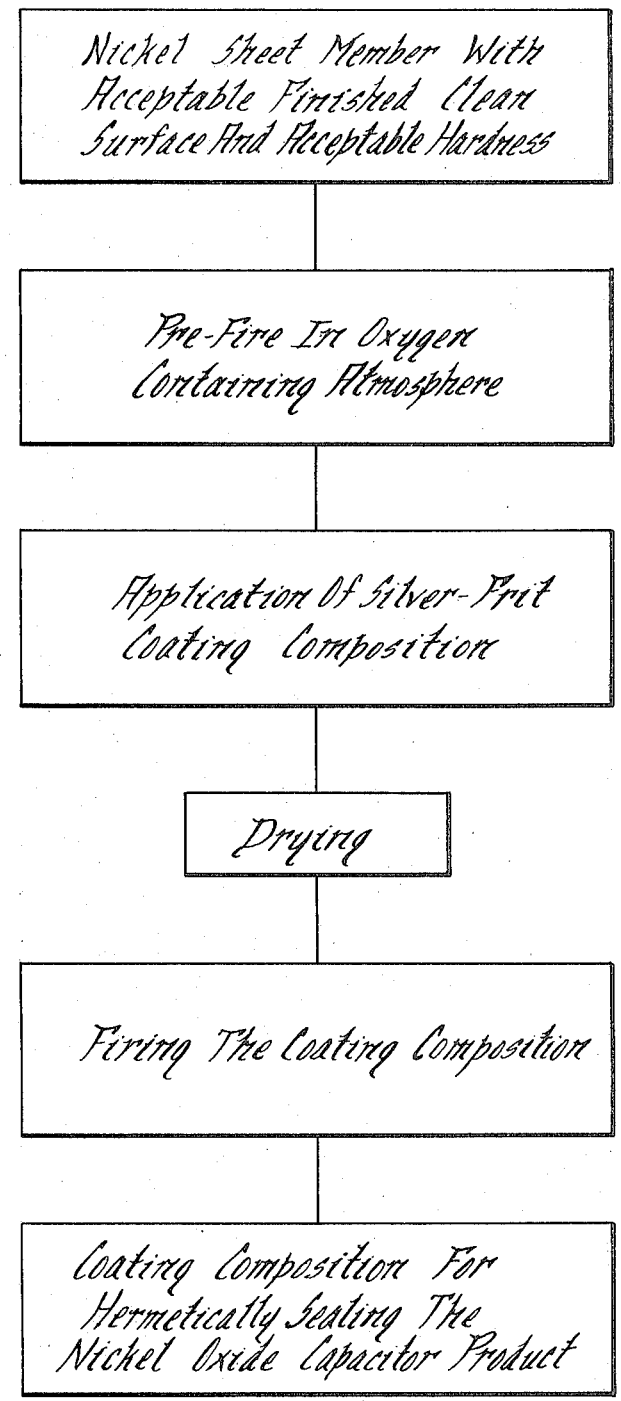

Briefly stated the present invention comprises a process of preparing a nickel oxide capacitor, said process comprising the steps of, providing a sheet member means formed essentially of nickel, said sheet member means generally having a thickness between about 8 and about 21 mils, said sheet member means possessing an acceptable finished clean surface with a finish between about 1 and about 30 rms on at least one side thereof and being of acceptable hardness, pre-firing said nickel sheet member means containing said clean surface in an atmosphere containing oxygen to form a nickel oxide layer on said surface, said pre-firing taking place at a temperature between about 1400° and about 2500°F, said atmosphere during pre-firing possessing a dew point from about 15° to about 80°F, said pre-firing taking place for a time duration of about one-sixth to about 4 hours, applying a coating composition over said nickel oxide layer, said coating composition consisting essentially of a silver coating material and a frit material and said coating composition being free of detrimental components which might effectively reduce volume resistivity of the nickel oxide layer, drying the coating composition, firing the coating composition at a temperature which is sufficiently high to generally remove excess oxygen in the nickel oxide layer, said frit material in the coating composition being operative for wetting and sealing the surface of the nickel oxide layer but wherein said sealing does not occur too rapidly so as to prevent removal of the excess oxygen which might thus result in possible undesirable blister formation, said firing taking place at a temperature between about 1650° and about 1900°F, within an atmosphere having a dew point from about 55° to about 85°F, said firing taking place for a time duration of about one-sixth to about 1 hour, hermetically sealing the capacitor by applying a second coating composition which is operative to prevent reabsorption of oxygen and which is applied sufficiently thin so as to prevent shear stresses from being set up upon cooling that might cause cracking of the underlying nickel oxide layer.

In another aspect, briefly stated, the present invention comprises an improved nickel oxide capacitor comprising, a sheet member means formed essentially of nickel, said sheet member means generally having a thickness between about 8 and about 21 mils, said sheet member means having had, an acceptable finished clean surface finish between about 1 and about 30 rms on at least one side thereof and, an acceptable hardness, a nickel oxide layer on said surface and being formed by pre-firing said nickel sheet member means in an atmosphere containing oxygen, said pre-firing having been made at a temperature between about 1400° and about 2500°F, said atmosphere during pre-firing having possessed a dew point from about 15° to about 80°F, said pre-firing having taken place for a time duration of about one-fourth to about 3 hours, a coating material means overlying said nickel oxide layer, said coating material having been formed by firing a coating composition consisting essentially of a silver coating material and a frit material at a temperature sufficiently high to generally remove excess oxygen in the nickel oxide layer, and said coating composition being free of detrimental components which might reduce volume resistivity of the nickel oxide layer, said firing taking place at a temperature between about 1650° and about 1,900°F, within an atmosphere having a dew point from about 55° to about 85°F, said firing taking place for a time duration of about one-sixth to about 1 hour, said frit material in the coating material means acting to seal the surface of the nickel oxide layer but without preventing a prior removal of excess oxygen from the nickel oxide layer, a hermetic sealing material layer means overlying said first coating material and being operative to prevent reabsorption of oxygen and being sufficiently thin to prevent shear stresses from being set up which might cause cracking of the nickel oxide layer.

DESCRIPTION OF PREFERRED EMBODIMENTS

The sheet member means selected for use in carrying out the process of this invention should be formed essentially of nickel. Broadly stated this sheet member should have a thickness between about 8 and about 21 mils. Preferably the thickness should be within the range of about 10 mils to about 15 mils. Below about 8 mils the nickel sheet or plate has tendency to bend and damage the resulting capacitor during the processing described herein. Above about 21 mils the difference in thermal contraction (during cooling) between the nickel and the oxide coating thereon has a tendency to result in the oxide coat cracking and flaking off.

The nickel sheet member should possess an acceptable finished clean surface on at least one side thereof. Broadly stated the finish should be a microfinish of about 1 to about 30 rms, however, on a preferred basis the finish should be between about 1 and about 8 rms; and, best results have been obtained when the finish is between about 2 and about 5 rms.

The nickel sheet member should also be of acceptable hardness and for example very suitable results have been obtained in accordance with the practice of this invention using a nickel sheet member having a hardness of approximately 83 (30 hardness scale). Broadly stated the hardness may satisfactorily vary within the range of about 50 to about 95.

The nickel sheet member may also contain other elements alloyed therewith such as titanium. For example a nickel titanium alloy may be used wherein, broadly stated, titanium is present in the nickel from zero percent up to about 3 percent by weight; and, preferably stated, from 0.2 to 3 percent by weight. Forms of nickel titanium alloys containing small amounts of titanium which are suitable for use in this invention are disclosed in copending application Ser. No. 736,672, filed June 13, 1968, the disclosure of which is incorporated herein by reference.

In accordance with the invention it has been discovered that during the initial pre-fire of the nickel oxide there are a number of factors that affect the type of oxide layer which is grown. These factors which have been found to be very important to successful practice of the invention are, temperature during pre-fire, the type of atmosphere maintained during pre-fire, the dew point of the atmosphere, and the duration or time period of pre-fire, and these factors are also critical during firing.

The most critical parameter of the foregoing is temperature, and it has been found that changes in temperature during pre-fire will make a significant change in the oxide growth, all other variables being held constant. The next most important variable is the dew point of the furnace atmosphere which is utilized during pre-fire. By the term dew point as used herein it is meant the temperature at which a vapor begins to deposit as a liquid and specifically in context with the disclosure herein it is meant the quantity of water in the oxygen containing atmosphere of the furnace or oven during pre-firing. The specific working atmosphere referred to generally stated may be comprised of air containing about 20 percent oxygen and 80 percent nitrogen.

With reference to the dew point temperatures specifically designated hereinafter these dew point temperatures have been measured by withdrawing a sample through a conduit or tube from the hot zone of the oven, during pre-firing or firing, and this sample is then analyzed in an Alnor Dew Point Instrument. The dew point within the pre-firing atmosphere in accordance with this invention is controlled by selectively injecting a predetermined controlled amount of water into the oven atmosphere through the use of a water bubbler thus enabling the amount of water in the furnace atmosphere to be controlled. While it is not intended to base the invention disclosed herein on any particular theory of operation, it has been discovered that an increase in the water content of the oven atmosphere has the effect of reducing the rate of oxide growth at a given temperature, time and atmospheric condition. If the dew point is decreased the rate of oxide growth and the total quantity of oxide grown in a given period of time increases. Oxide growth rate also depends on the total quantity of oxygen present and if all other parameters are held constant, and the quantity of oxygen is increased then the oxide growth rate and the total quantity of oxide grown in a given time will increase.

In accordance with the above and the inventive disclosure herein, it has been found that the temperature during pre-firing should be maintained within the broad range of about 1400° to about 2500°F. Preferably this temperature during pre-firing should be maintained within the range of about 1700° to about 1850°F, and best results are obtained when the temperature is maintained within the range of about 1750° to about 1800°F.

Furthermore the dew point which as discussed above should importantly and carefully be correlated with the temperature range mentioned above such that the dew point is maintained, broadly stated, within the range of about 15° to about 80°F. Preferably this dew point should be maintained within the range of about 25° to about 55°F during pre-firing, and best results are obtained when the dew point is maintained within the range of about 30° to about 50°F during pre-firing.

In likewise fashion it is very important to correlate the time period or duration of pre-firing such that it is correlated with the conditions of temperature and dew point stated above, and broadly stated, the duration of pre-firing should be within the range of about one-sixth to about 4 hours. Preferably the duration of pre-firing should be within the range of about one-fourth up to about 1½ hours, and best results are obtained when the duration of pre-firing is between about one-third and about 1 hour.

After pre-firing of the nickel sheet member in an atmosphere containing oxygen as described above there is formed a nickel oxide layer on the surface of the nickel member.

There is then applied a coating composition over the nickel oxide layer and this coating composition consists essentially of a silver coating material and a frit material, and said coating composition should be one which is free of detrimental components which might effectively reduce the volume resistivity of the nickel oxide layer. The frit material or the glass portion of the coating composition must be capable of wetting and sealing the nickel oxide surface. As stated the coating composition must not contain detrimental elements such as lithium or other alkaline components that would poison and/or reduce the volume resistivity of the nickel oxide layer. Furthermore the coating composition must not contain excess amounts of fluxing agents or heavy metal atoms such as lead, which might have the same affect as the alkaline compounds of reducing the volume resistivity. A particularly suitable coating composition for this purpose is a silver/palladium glass coating composition, which is generally alkali free, available as formulation No. 4020 from Alloys Unlimited Co.

After the coating composition is applied it is allowed to dry or bake such that the carrier components of the coating composition are driven off; and, preferably the drying of the coating composition is carried out at a temperature within the range of about 800° to about 1300°F.

Firing of the coating composition is carried out at a temperature which is sufficiently high to generally remove excess oxygen in the nickel oxide layer, and the frit material in the coating composition disclosed herein is operative for wetting and sealing the surface of the nickel oxide layer, but said sealing action which does occur does not happen too rapidly so as to prevent removal of the excess oxygen which might thus result in possible undesirable blister formation on the surface of the finished product.

The silver material portion of the coating composition should possess the property of not exhibiting excessive metal migration or metal evaporation when maintained at the elevated temperatures of firing. If the silver portion were to exhibit metal migration or metal evaporation at these elevated temperatures then even though the oxygen were driven out or removed from the nickel oxide layer, still the metal migration or metal evaporation would cause a lowering in insulation resistance, and it is also because of this that there has been found to be a very important temperature range within which the firing step of this invention should be carried out.

If the firing temperature is too low then the insulation resistance is low because of the excess oxygen in the nickel oxide layer, and on the other hand if the firing temperature is too high metal migration or metal evaporation will occur which will also result in a lowering of the insulation resistance of the final capacitor product formed.

Accordingly it has been found that the firing should take place at a temperature, broadly stated, between about 1650° and about 1900°F. Preferably this temperature range during firing should be within the range of about 1725° to about 1825°F, and best results are obtained when the temperature during firing is maintained within the range of about 1750° to about 1800°F.

Further, the dew point during firing has also been found to be highly important in order to obtain a capacitor product which has a satisfactory and acceptable insulation resistance and, the dew point should be, broadly stated, within the range of about 55° to about 85°F during firing. Preferably this dew point should be maintained within the range of about 60° to about 80°F, and best results have been obtained when the dew point is maintained within the range of about 65° to about 75°F during firing.

The time period or duration of firing should broadly be within the range of about one-sixth up to about 1 hour. Preferably the duration of firing should be within the range of about one-fourth to about 1 hour, and best results have been obtained when the duration of firing is maintained within the range of about one-fourth to about three-fourths hour.

Hermetic sealing of the capacitor product formed in accordance with the process of this invention is carried out by applying a second coating composition after firing which second coating composition is operative to prevent reabsorption of oxygen and which second coating composition is applied sufficiently thin so as to prevent shear stresses from being set up upon cooling that might cause cracking of the underlying nickel oxide layer. This second coating composition is normally a glass coating system and it should be a non-vitreous, recrystallizable, dielectric, hermetic sealing glass composition. Further, this second coating composition should not contain any alkali or lead compounds. The rheology of this second glass coating system should preferably be adjusted such that the finished fired thickness is in the one-half to 1 mil thick region. In other words this glass coating system or the second coating composition should not be so thick as to cause, upon cooling, shear stresses that would cause cracking of the substrate nickel oxide layer.

The advantages of the invention should be fairly apparent from the description hereinabove. In particular, however, it should be apparent that preparation of a nickel oxide capacitor in accordance with the disclosure of this invention involves a processing technique which must be such that in the finished capacitor product there is a minimum amount of excess oxygen in the nickel oxide dielectric layer. It should also be apparent that the process of this invention results in the preparation of a unique capacitor wherein a highly acceptable insulation resistance rating is obtained while coincidentally the properties of loss angle, and voltage breakdown are also of a highly satisfactory, commercially acceptable nature. Furthermore, in the process of this invention in the nickel oxide layer which is formed there is an excess of oxygen which is subsequently removed and the resulting layer which is formed in the final capacitor product is quite flexible and elastic and, the layer which is formed is highly resistant to chipping or scaling. Still further in the process of this invention there is deliberately grown an elastic nickel oxide layer during pre-firing which layer contains an excess of oxygen, and this formation of an excess of oxygen is then followed by a subsequent metallization technique or firing step wherein the excess oxygen is removed and the surface is sealed such that the reabsorption of any oxygen is prevented. Lastly, another important advantage of this invention is that the excess oxygen which in effect is built in during the pre-firing, contributes to the effectiveness of the subsequent metallization or firing, that is, it results in having an elastic oxide layer just prior to the metallization step, and the result of this is that when the oxide layer is set up so to speak there is not any subsequent excessive chipping or brittleness after metallization, that is, after the coating composition of silver material and frit material is applied. The reason for this is that during the process the excess oxygen is driven out during the metallization and the result is a high resistance or low conductivity oxide layer.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A process of preparing a nickel oxide capacitor, said process comprising the steps of, providing a sheet member means formed essentially of nickel, said sheet member means generally have a thickness between about 8 and about 21 mils, said sheet member means possessing an acceptable finished clean surface with a finish between about 1 and about 30 rms on at least one side thereof and being of acceptable hardness, pre-firing said nickel sheet member means containing said clean surface in an atmosphere containing oxygen to form a nickel oxide layer on said surface, said pre-firing taking place at a temperature between about 1400° and about 2500°F, said atmosphere during pre-firing possessing a dew point from about 15° to about 80°F, said pre-firing taking place for a time duration of about one-sixth to about 4 hours, applying a coating composition over said nickel oxide layer said coating composition consisting essentially of a silver coating material and a frit material and said coating composition being free of detrimental components which might effectively reduce volume resistivity of the nickel oxide layer, drying the coating composition, firing the coating composition at a temperature which is sufficiently high to generally remove excess oxygen in the nickel oxide layer, said frit material in the coating composition being operative for wetting and sealing the surface of the nickel oxide layer but wherein, said sealing does not occur too rapidly so as to prevent removal of the excess oxygen which might thus result in possible undesirable blister formation, said firing taking place at a temperature between about 1650° and about 1900°F, within an atmosphere having a dew point from about 55° to about 85°F, said firing taking place for a time duration of about one-sixth to about 1 hour, hermetically sealing the capacitor by applying a second coating composition which is operative to prevent reabsorption of oxygen and which is applied sufficiently thin so as to prevent shear stresses from being set up upon cooling that might cause cracking of the underlying nickel oxide layer.

2. The invention of claim 1 wherein,
said nickel sheet member contains up to about 3% by weight titanium.

3. The invention of claim 1 wherein,
said thickness of the sheet member means is between about 10 and about 15 mils, said temperature during pre-firing is between about 1700° and about 1850°F, said dew point during pre-firing is from about 25° to about 55°F, said time duration for pre-firing is from about one-fourth to about 1½ hours, and said temperature during firing is between about 1725° and about 1825°F, said dew point during firing is from about 60° to about 80°F, said time duration for firing is from about one-fourth to about 1 hour.

4. The invention of claim 1 wherein,
said thickness of the sheet member means is between about 10 and about 15 mils, said temperature during pre-firing is between about 1750° and about 1800°F, said dew point during pre-firing is from about 30° to about 50°F, said time duration for pre-firing is from about one-third to about 1 hour, and, said temperature during firing is between about 1750° and about 1800°F, said dew point during firing is from about 65° to about 75°F, said time duration for firing is from about one-fourth to about three-fourths hour.

5. The invention of claim 3 wherein,
said drying is carried out at a temperature between about 800° and 1300°F, and said finish is between about 1 and about 8 rms.

6. The invention of claim 4 wherein,
said drying is carried out at a temperature between about 800° and 1300°F, and said finish is between about 1 and about 8 rms.

* * * * *